United States Patent Office 2,717,199
Patented Sept. 6, 1955

2,717,199

HYDROGEN CHLORIDE RECOVERY

David H. Campbell, Baton Rouge, La., assignor to Ethyl Corporation, New York, N. Y., a corporation of Delaware No Drawing. Application November 8, 1954,
Serial No. 467,633

5 Claims. (Cl. 23—154)

This invention relates to the recovery and purification of hydrogen chloride. More specifically, the invention relates to the recovery of this valuable hydrogen halide by formation of addition compounds with certain materials, and subsequent regeneration therefrom.

The problem of recovery of hydrogen chloride in industrial operations is becoming of increasing importance with the growing interest in substitution chlorination processes. Basically, the substitution chlorination of hydrocarbons is an expeditious route to many organic chlorides but has heretofore introduced many ancillary problems which have prevented its full potential utilization. In particular, substitution chlorination always results in the formation of substantial quantities of hydrogen chloride, which poses a very significant recovery problem. In the past, the utilization of these chlorination methods has necessitated generally the absorption of the hydrogen chloride in an aqueous muriatic acid system. This prior recovery method, while theoretically capable of extremely efficient recovery, has certain inherent weaknesses. Aqueous hydrochloric acid is notably corrosive. In addition, in order to recover a concentrated hydrogen chloride gas, a multi-stage fractional distillation is required. This fractionation is limited, in practice, to stripping the hydrogen chloride content of a strong acid only to the extent of forming a high boiling azeotrope in the liquid phase. The overhead gas from such a fractionation is also a wet gas which must be dried by a sulfuric acid scrubbing operation or the like, and such a drying operation is essential for preparing the hydrogen chloride for use in many of the operations in which it can be used. For example, if the hydrogen chloride gas recovered is to be used for the hydrochlorination of an olefin or a diolefin, an anhydrous gas is necessary. Inorganic adsorbent slats such as copper chloride, lead chloride, or similar compounds have been proposed for hydrogen chloride recovery, but insofar as is known these have not been employed commercially. A definite need has existed for a practical technique for the rapid removal of a hydrogen chloride component from a gaseous effluent from a chlorination operation, or from a similar source, with a high degree of isolation of the hydrogen chloride therefrom and an easy and effective method of subsequently recapturing such removed hydrogen chloride as a concentrated anhydrous gaseous stream. Further, a need has existed for such an operation which does not introduce severe corrosion problems either in the recovery operation itself or in the ancillary operation wherein the hydrogen chloride is ultimately consumed or utilized.

A principal object of the present invention is to provide a new and improved process for the removal of hydrogen chloride from dilute gaseous streams containing this material, and for its delivery as a concentrated anhydrous gas. A more specific object is to provide a process for the rapid removal of hydrogen chloride from a supply gas stream relatively dilute in hydrogen chloride, and for its efficient delivery as a highly concentrated, anhydrous stream at desirable pressures. An additional object is to provide a hydrogen chloride recovery and concentration process particularly suitable for recovering the hydrogen chloride content from admixture with low molecular weight alkane hydrocarbons. An additional and more specific object is to provide a process providing the principal benefits as above stated and also for obtaining a utilization of rate change to best advantage. An alternative object is to provide a particularly useful technique which provides the principal benefits of the process and also the desirable features of a conventional absorption in a liquid absorbent. Other objects will appear hereafter.

The process of the invention involves generally contacting a gaseous stream having hydrogen chloride as a component therein with a tetramethyl ammonium halide selected from the class consisting of tetramethyl ammonium chloride and tetramethyl ammonium bromide. The hydrogen chloride is readily removed from the gas stream by these materials, with a high degree of effectiveness and with the formation of an addition compound, viz., tetramethyl ammonium chloride hydrochloride or tetramethyl ammonium bromide hydrochloride. Subsequent to the removal of the hydrogen chloride from the gas stream in this manner, it is regenerated by decomposing the addition compounds, preferably by heating same.

As will be apparent from the data and examples given hereafter, the conditions employed in the process can be greatly varied according to specific needs. Certain limitations exist with respect to the amount of hydrogen chloride combined with the tetramethyl ammonium halide. The proportion of moles of hydrogen chloride to moles of the tetramethyl ammonium halide, which is hereafter referred to as the "operating ratio," should not exceed unity. In other words, the practical limit of recovery is reached when the hydrogen chloride has been taken up to an extent approaching an operating ratio of one. A preferred range, established by rate considerations, is an operating ratio of not more than about 0.8:1.0 for the recovery, and not less than about 0.2:1.0 for the regeneration steps.

A variety of contacting techniques can be employed in effecting the process. The simplest and also a highly effective method comprises maintaining a permanently stationary bed of loosely packed granules of the tetramethyl ammonium halide in an appropriate processing vessel, e. g. a vertical drum, of say about 15 to 20 feet in height. A plurality of such vessels or units are provided for steady operation, with one or more units always recovering the hydrogen chloride and one or more units always engaged in regenerating the hydrogen chloride. For the regenerating operation, appropriate heat supply means are provided for the vessels, which can be either heating medium jackets or internal heating coils.

The tetramethyl ammonium halide as employed in the fashion mentioned above can either be the sole component present, or it can be supported by an inert high surface type of carrier. If the tetramethyl ammonium halide is employed without a carrier, it is usually desirable to provide supporting trays at several levels in the drum, particularly if a total bed depth of the order of 15 to 20 feet is utilized.

Another mode of operation of the process involves maintaining the tetramethyl ammonium halide as a fluidized solids system during the recovery step of the operation. Still another mode of operation involves providing a slurry of the tetramethyl ammonium halide in an inert liquid for the recovery step, and thereby achieving the benefits of operations with liquid absorbent systems while avoiding the disadvantages. The advantages of these and other modes of operation will be more clearly understood from the detailed description and examples following.

It has been discovered that the tetramethyl ammonium halides, $(CH_3)_4NBr$ and $(CH_3)_4NCl$, are particularly effective materials for the recovery and regeneration of hydrogen chloride for a variety of reasons. In particular, and in contrast to other nitrogenous materials, these quaternary alkyl substituted nitrogen halides retain their solidity and chemical stability to quite high temperatures. In addition, these materials readily and rapidly form addition compounds with hydrogen chloride and these addition compounds also remain in the solid phase, through a wide range of temperature. The importance of this discovery lies in the fact that in either the recovery or regeneration steps, the degree of recovery from a dilute hydrogen chloride feed gas is virtually unaffected by the differential between the partial pressure of the hydrogen chloride in the gas phase and the decomposition pressure of hydrogen chloride over the solid addition compound, but instead is a constant for given temperature, with reference, of course, to any specific feed hydrogen chloride stream concentration. Therefore, whereas an efficient absorption in a liquid absorbent always requires a true countercurrent contacting operation to most effectively remove a hydrogen chloride component from a gaseous stream, in using the present process, no countercurrent contacting is required, and a static bed of solids can be effectively used, although other contacting techniques are not precluded.

One of the significant features of the tetramethyl ammonium halides employed in the process is their high degree of stability. Thus, although tetramethyl ammonium chloride is decomposable by heating, the temperature range at which appreciable decomposition occurs is so high, relative to the temperature needed for hydrogen chloride recovery and regeneration, that it can be considered as perfectly stable for all practical purposes. A corollary advantage is high change in hydrogen chloride partial pressure, above the addition compound, with changes in temperature.

The table of hydrogen chloride partial pressures below illustrate the above mentioned feature. The addition product for which these vapor pressure data were obtained was made by contacting powdered tetramethyl ammonium chloride with a dilute hydrogen chloride stream and recovering the hydrogen chloride therefrom by forming an addition compound therewith. The operating ratio was 0.5:1.0 upon completion of this recovery, and then the hydrogen chloride pressures above the addition material were measured.

| Temperature, ° C. | Hydrogen Chloride Pressure/ mm.Hg |
|---|---|
| 20 | 1.5 |
| 30 | 4 |
| 40 | 8.5 |
| 50 | 16 |
| 60 | 29 |
| 70 | 48 |
| 80 | 78 |
| 90 | 120 |
| 100 | 185 |
| 110 | 300 |
| 120 | 445 |
| 130 | 625 |
| 140 | 850 |
| 150 | 1,200 |

The foregoing hydrogen chloride pressure data provide a convenient guide for rapid determination of the degree of recovery of hydrogen chloride from any given feed stream. Thus, for processing a feed stream containing about 50 mole percent hydrogen chloride, and under a total pressure of 50 pounds per square inch, gauge, the hydrogen chloride recovery is over 99 percent for recovery temperatures up to about 60° C.

The vapor pressure data given above apply not only for an addition compound having an operating ratio of 0.5:1.0, but also for these systems with operating ratios above and below that level. When the operating ratio is very much below about 0.3:1.0, the equilibrium partial pressures are slightly lower than these tabulated.

*Example 1*

To illustrate the efficiency of recovery of hydrogen chloride by the present method, this example describes a typical recovery operation. A supply of tetramethyl ammonium chloride, $(CH_3)_4NCl$, was charged in a contacting vessel providing a superficial surface area of the charge of about 1.6 square feet per pound.

The supply of tetramethyl ammonium chloride (TMAC) was contacted with a gas supply comprising anhydrous hydrogen chloride having a partial pressure of 458 mm. of mercury. Hydrogen chloride was rapidly taken up by the solids until the amount thus recovered or isolated was approximately 32.9 pounds to 100 pounds of TMAC, this take up corresponding to an operating ratio of 0.98, or 0.98 mole of hydrogen chloride to 1 mole of TMAC.

The contact times required for combination to lower degrees of take up, or lower operating ratios, under the above conditions were as follows:

| Time, Seconds | Operating Ratio, Moles HCl:Mole TMAC |
|---|---|
| 0 | 0.0 |
| 160 | 0.35 |
| 200 | .44 |
| 335 | .52 |
| 430 | .54 |
| 770 | .58 |
| 1,130 | .61 |
| 3,000 | .63 |

From the foregoing it will be seen that the rate of recovery of the hydrogen chloride is greatest in attaining the lower operating ratio. In any particular embodiment, this factor as well as others hereafter discussed, will affect the proportions of materials and the contact times employed.

The use of the addition product, formed as in Example 1, in regenerating anhydrous concentrated hydrogen chloride gas is illustrated by the following example.

*Example 2*

A supply of TMAC was employed to recover hydrogen chloride in the manner described in the foregoing example, providing a solid addition product with an operating ratio of approximately 0.97. This supply was maintained in a regenerating vessel under the same surface-weight conditions as before, i. e., with a superficial surface: mass ratio of about 1.6 square feet:pound. The supply was heated to 120° C. and a pure, anhydrous hydrogen chloride gas stream was evolved, as tabulated below:

| Time, Seconds | Operating Ratio, Moles HCl:Mole TMAC |
|---|---|
| 0 | 0.98 |
| 140 | 0.5 |
| 280 | 0.25 |
| 560 | 0.125 |

*Example 3*

A supply of tetramethyl ammonium bromide (TMAB) was utilized in the same manner as in Example 1 and similar results were obtained. Upon regenerating pure hydrogen chloride gas by heating, a similar rate of evolution to that experienced in Example 2 was obtained. It was found that there was no interchange of halogens, i. e., that hydrogen chloride uncontaminated with hydrogen bromide was regenerated.

In the foregoing examples, it will be noted that the ratio of surface, or superficial surface, to the mass of the solids was quite low in order to facilitate performance measurements. The rate of recovery, or the rate of regeneration of pure hydrogen chloride can be directly affected by various techniques for increasing the effective superficial area of the solid TMAC or TMAB. One way of providing this increase in effective area is to provide a mechanically agitated bed of granular solids. For example, the TMAB or TMAC may be provided as a bed of granules of about 1/16 to about 1/8 inch mean diameter, the bed having a depth of from five to twenty feet. A relatively slow revolving agitator situated in this bed assures that a high effective surface:mass ratio of the solids can be maintained. In this manner the contact time for recovery or the time for regeneration can be reduced by a factor of about five or greater in comparison with the results of Example 1 or Example 2, as in the following example.

*Example 4*

A multi-layered bed of granular tetramethyl ammonium chloride is provided, consisting of five layers of about three foot depth. Each layer is supported on a perforated plate in a tower, and a slow moving agitator (about 1/2 to 1 R. P. M.) is provided in each layer.

A stream of anhydrous effluent gas from a chlorination plant, containing about 25 mole percent hydrogen chloride, is introduced at the bottom of the bed. Operating conditions of about 50 pounds per square inch and a temperature of about 50° C. is maintained. The feed gas is introduced at a rate providing a contacting time of about 15 seconds. Removal of 98 percent or better of the hydrogen chloride is effected.

The contacting is discontinued when the hydrogen chloride take up corresponds to an operating ratio from 0.75 to 0.8:1.0, the feed gas being then switched to a second parallel unit. Heat is applied to the first unit and the contents raised to a temperature of from 135 to 150° C. Pure anhydrous hydrogen chloride gas is generated at a pressure slightly above atmospheric and the generation is continued until the average operating ratio is reduced to about 0.2:1.0.

Another and highly effective technique in carrying out the solids contacting, particularly in the recovery step, involves fluidizing the solid tetramethyl ammonium chloride, as described in the following example.

*Example 5*

A gaseous stream from an ethane chlorination operation is available at a pressure of about 80 pounds per square inch, gauge, and a temperature of about 50° C. The average composition of the stream, the chloroethanes having largely been removed, is 66 mole percent gaseous hydrocarbons, 33 mole percent hydrogen chloride and about 1 mole percent other components, principally ethyl chloride. The gaseous hydrocarbons consist of about 92 percent excess ethane, the balance being small amounts of ethylene and methane.

This feed stream is introduced at the bottom of a recovery zone containing a supply of finely divided tetramethyl ammonium chloride solids. A suitable particle size distribution is from 5 to 25 weight percent retained on an 80 mesh screen, and from 60 to 85 percent retained on a 170 mesh screen. The feed gas is passed upwardly through the solids bed at a superficial gas velocity of from about 0.3 to about 1 foot per second, a total apparent contact time of about 15 to 50 seconds being provided. The rising gases cause fluidization of the solids and extremely effective contacting is provided, resulting in a recovery of the order of 95–98 percent of the hydrogen chloride in the feed.

A stream of the solids is continuously removed from the bottom portion of the fluidized contacting zone, these solids bearing an operating ratio of about 0.75 to 0.8:1.0. They are then transferred to a regeneration unit comprising a series of parallel tubes of about three inches in diameter. Provision is made for continuous gravity flow of the solids through the tubes and during such flow they are heated to a temperature of about 135 to 140° C. Concentrated anhydrous hydrogen chloride gas is generated at atmospheric or slightly supra atmospheric pressure. If higher delivery pressures are needed, higher regeneration temperatures are provided. The solids are withdrawn from the regeneration unit at an operating ratio of about 0.2:1.0 and returned to the recovery unit.

An advantage of particular interest in the embodiment of the process illustrated by the above example arises out of the apparent increase in density of the solids with increase in operating ratio, i. e., as hydrogen chloride is taken up. There is apparently a decrease in specific volume with an increase in operating ratio, so that the solids having the higher operting ratio tend to approach or concentrate in the bottom portion of the fluidized solids zone. This feature lends itself particularly to continuous operation and to a high degree of recovery.

With respect to continuous operation, the concentration of solids with a high operating ratio near the bottom of the fluidized solids contactor permits their continuous and relatively selective withdrawal for regeneration purposes. The high degree of recovery results from the fact that the classification referred to above concurrently concentrates solids with a low operating ratio in the upper part of the reactor. This is advantageous since, although the operating ratio does not normally affect the equilibrium pressure of the hydrogen chloride at any given temperature, it does have an effect on the rate. Hence, a higher relative rate of combination is provided at the upper portion of the contacting zone which is quite beneficial in removing the last portions of hydrogen chloride to the desired concentrations.

In an integrated continuous recovery and regeneration process as above described, it will be obvious that wide latitude exists wtih respect to the limits of operating ratios employed. Generally, it has been found highly desirable not to operate between the full potential extremes, but to discontinue recovery when the withdrawn solids have an operating ratio of 0.8 or less and to discontinue regeneration when the solids have an operating ratio of not less than about 0.2. As heretofore mentioned, it has been found that the operating ratios to some extent affect the rate at which combination or regeneration occurs.

An additional and highly effective mode of carrying out the recovery and regeneration steps involves supporting and carrying the tetramethyl ammonium halide in a slurry in an inert carrier liquid. According to this procedure, the inert carrier liquid is employed in proportions that the slurry is readily pumpable. For example, a solids:liquid proportion of about 1 part by volume of solids to about 5 parts of liquid provides a thin, readily pumpable slurry. Higher and lower solid:liquid proportions can be used if desired. A preferred range of weight ratios is from 0.1 to 0.5 parts by weight of solids to one part of inert liquid.

A variety of inert liquids can be employed, but in all cases, the liquid should be virtually inert to the hydrogen chloride and in addition, should preferably have a density equal to or greater than the density of the tetraalkyl ammonium halide. Carbon tetrachloride is a highly effective liquid carrier. Another and preferred liquid carrier is 1,2,4-trichlorobenzene, or mixtures of this isomer with the other isomers of trichlorobenzene.

The following example illustrates a typical operation following this mode of operation.

*Example 6*

Dry powdered tetramethyl ammonium chloride was mixed with 1,2,4-trichlorobenzene to provide a slurry containing approximately 13 weight percent TMAC. This slurry was then contacted, with stirring and at a temperature of about 25° C., with a supply of hydrogen chloride containing gas, the partial pressure of the gas being 105 mm. of mercury. The hydrogen chloride was rapidly absorbed to an operating ratio, based on the tetramethyl ammonium chloride, of about 0.6. The hydrogen chloride was then regenerated as a concentrated, anhydrous gas by heating to about 135° C.

As with other forms of the process, the recovery operation is to be terminated before an operating ratio of unity is attained, this operating ratio being based upon the amount of the tetraalkyl ammonium halide present. Preferably, the operating ratio should not exceed 0.8:1.0, and, during the regeneration step, should not be reduced below about 0.2:1.0.

An interesting fact observed in the operation of the embodiment using a slurry of TMAC is that the equilibrium vapor pressure of the hydrogen chloride over a slurry system corresponds virtually identically with the corresponding pressures over the solid addition compounds. The presence of the inert solvent thus does not effect the properties of the tetraalkyl ammonium halides or their addition compounds.

During the regeneration, there is frequently a tendency, with a slurry type operation, to vaporize small amounts of the inert liquid as the hydrogen chloride is regenerated. This material is readily isolated from the product gas by a straightforward condensation.

From the foregoing description, it is apparent that the process of my invention is capable of wide variation in details. It should be noted that moisture should be avoided for several reasons. The solid tetraalkyl ammonium halides employed in the process are quite deliquescent, and if water vapor is present, it is taken up and the recovery effectiveness of the solids is diminished. In addition, the presence of moisture introduces a corrosion factor and negates one of the particular advantages of the process.

While it is preferable and simpler to employ single component solids, it is perfectly feasible to carry out the process with mixtures of tetramethyl ammonium chloride and tetramethyl ammonium bromide, although no specific advantages are thus realized.

A further factor of interest for commercial operation is the improvement of the solids performance with time. This is exhibited primarily as a rate factor. A previous history of use of the solids for recovery and regeneration assures maximum and reproducible rates of recovery and regeneration. In other words, the rates of hydrogen chloride take up and regeneration are faster in a second and succeeding cycle than with an initial cycle with fresh tetramethyl ammonium halide.

Having fully described the invention and the manner of its operation, what is claimed is:

1. A process of recovering concentrated hydrogen chloride gas from an anhydrous mixture with other gases comprising contacting said mixture with a tetraalkyl ammonium halide selected from the group consisting of tetramethyl ammonium chloride and tetramethyl ammonium bromide, forming thereby a solid addition product of the hydrogen chloride and tetramethyl ammonium halide, said addition product containing not more than one mole of hydrogen chloride to one mole of tetramethyl ammonium halide, and then heating said addition product and decomposing at least a portion of the addition product into concentrated anhydrous hydrogen chloride and tetramethyl ammonium halide.

2. A process of recovering concentrated hydrogen chloride gas from an anhydrous mixture with other gases comprising contacting said mixture with a bed of granular solid comprising tetramethyl ammonium chloride, said contacting being at a temperature of less than about 60° C. and for a contact time of from about 10 to 100 seconds whereby an addition product of tetramethyl ammonium chloride and hydrogen chloride is formed, said addition product containing not more than about 0.8 mole of hydrogen chloride to one mole of tetramethyl ammonium chloride, then heating said bed to a temperature above 135° C., regenerating thereby concentrated anhydrous hydrogen chloride at at least atmospheric pressure, and discontinuing said regeneration when the hydrogen chloride content of the solids has decreased to not less than about 0.2 moles to one mole of tetramethyl ammonium chloride.

3. A process of recovering concentrated hydrogen chloride gas from an anhydrous mixture with other gases comprising flowing said mixture upwardly through a contacting zone, contacting therein with finely divided solids comprising tetramethyl ammonium chloride, and fluidizing said solids by the flow of the mixture, forming thereby a solid addition compound of the hydrogen chloride and tetramethyl ammonium chloride having less than one mole of hydrogen chloride to one mole of tetramethyl ammonium chloride, the addition compound solids with the largest amount of hydrogen chloride being more concentrated at the bottom of said contacting zone, withdrawing addition compound solids from the bottom of said zone and regenerating at least part of the hydrogen chloride by heating said addition compound solids, and then returning the solids to the contacting zone.

4. A process of recovering concentrated hydrogen chloride gas from mixture with other gases comprising contacting said mixture in a contacting zone with a slurry of solids comprising tetramethyl ammonium chloride in a liquid inert to hydrogen chloride forming thereby a slurry of a solid addition compound of hydrogen chloride and tetramethyl ammonium chloride in the liquid, the addition compound having not more than one mole of hydrogen chloride to one mole of tetramethyl ammonium chloride, withdrawing said slurry from the contacting zone and heating sufficiently to decompose at least a part of the addition compound and generate anhydrous concentrated hydrogen chloride, and returning the slurry to the contacting zone.

5. The process of claim 4 further defined in that the liquid of the slurry comprises 1,2,4-trichlorobenzene.

No references cited.